Dec. 22, 1936.  J. COMPTE Y RIQUÉ  2,064,947

SLEEVE BUTTON OR CUFF LINK

Filed March 22, 1935

Inventor:

Patented Dec. 22, 1936

2,064,947

UNITED STATES PATENT OFFICE 2,064,947

SLEEVE-BUTTON OR CUFF LINK

Julio Compte y Riqué, Montevideo, Uruguay

Application March 22, 1935, Serial No. 12,410

3 Claims. (Cl. 24—107)

My invention relates to improvements in sleeve-buttons or cuff-links and similar devices, and the objects of my improvements are to strengthen the union of the companion-buttons with great easiness of the closing and opening thereof.

I attain these objects by mechanism illustrated in the accompanying drawing, in which—

Figure 1:
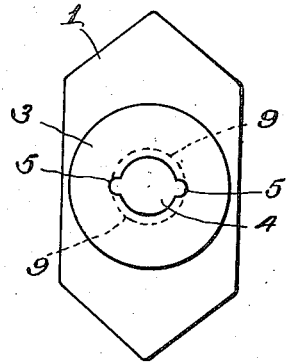
Figure 2:
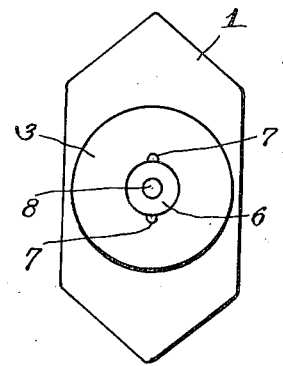
Figure 3:
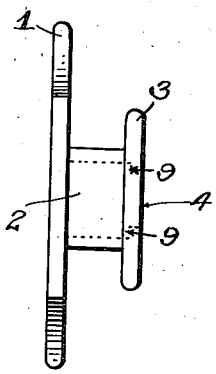
Figure 4:
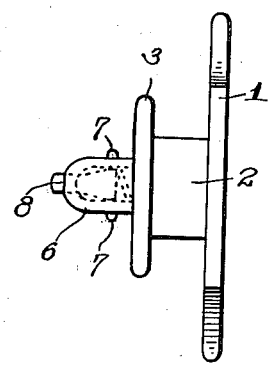

Fig. 1 is a rear view of the female-button.
Fig. 2 is a rear view of the male-button.
Fig. 3 is a side view of the female-button.
Fig. 4 is a side view of the male-button.

Several numbers refer to similar parts throughout the several views.

1, 1 are the visible parts of the buttons when placed and closed in the cuff. 2, 2 are the parts that go through the button-holes. 3, 3 are the disks usually fastened, one in each button of this kind. 4 is a hole in the female-button, with grooves 5, 5. In this hole enters a plug 6 of the male-button, and his teeth or nails 7, 7, which pass through grooves 5, 5. Said hole is circular and of the dimension of the dotted circumference in Fig. 1, inside the body of the button, with a lid perforated as shown in Fig. 1 with grooves 5, 5.

The buttons can only be as explained (without nipple 8 in plug 6) if parts 1, 1 are longer than they are broad. In this case the companion buttons are fastened by inserting the plug 6 in hole 4, with parts 1, 1 in cross position, and after revolving one button 90° in order to put parts 1, 1 in parallel position. If the parts 1, 1 are circular, square or nearly square, the following device will be advantageous.

Nipple 8 is the end of a little plug which enters into plug 6 and is moved by a little spring enclosed in plug 6, just as it is usual in other mechanical devices. When plug 6 is introduced into hole 4, the nipple 8 is forced inside and repels both buttons. Afterwards, by revolving one or both buttons in order to put them into a locked position, the teeth or nails 7, 7, reach the parts 9, 9, of the disk 3 of the female-button, which parts form light grooves so as to retain the teeth or nails 7, 7.

I claim:

1. A separable sleeve-button, cuff-link or similar device comprising a male and female member, the male member provided with a head formed with a shank and a projection extending at right angles to the shank, the female member provided with a tube and a slotted cap thereon, the projection on the shank being adapted to pass through the slot in the cap and engage the inner face thereof upon rotation of one member relative to the other, a plug in the shank provided with a nipple extending through the end of the shank and means to maintain the nipple in extended position and maintain the members in frictional engagement when assembled.

2. In a separable sleeve-button, cuff-link or the like in which a shank on the male member is received in a tube on the female member, teeth projecting at right angles to the shank, a slotted cap on the tube adapted to receive the teeth on the shank, spring pressed means located in the shank provided with a nipple projecting from the end of the shank and adapted to maintain the teeth in frictional engagement with the inner face of the cap when the members are assembled.

3. In a separable sleeve-button, cuff-link or the like as claimed in claim 2 wherein the teeth on the shank are diametrically opposed to each other.

JULIO COMPTE Y RIQUÉ.